Inventors:
Marion C. Wilson
Emil Veselik
Bohumil A. Zikmund
BY Brown, Jackson,
Boettcher & Diemer
Attys:

United States Patent Office 2,816,627
Patented Dec. 17, 1957

2,816,627
RETRACTABLE WHEEL CHOCK

Marion C. Wilson, Hammond, Ind., Emil Veselik, Chicago, Ill., and Bohumil A. Zikmund, Munster, Ind., assignors to Calumet Steel Castings Corporation, Hammond, Ind., a corporation of Indiana Application January 21, 1954, Serial No. 405,345

17 Claims. (Cl. 188—32)

The present invention relates to chocks for blocking the wheels of vehicles, airplanes and the like, and particularly to wheel chocks wherein the wheel engaging member is adapted to be automatically and positively retracted from the wheel to free the wheel when desired.

The present application is a continuation-in-part of our earlier application, Serial No. 279,358 filed March 29, 1952, now abandoned.

An object of the present invention is to provide improved wheel chocks adapted to be moved into firm engagement with a wheel and adapted to be automatically retracted from the wheel with little effort.

Another object of the invention is to provide improved wheel chocks including a wheel engaging surface, a ground engaging purchase surface and collapsible linkage means between said surfaces whereby the chock is adapted to be moved against and readily retracted from a wheel.

A further object of the invention is the provision of improved wheel chocks including a wheel engaging surface, a ground engaging purchase surface, linkage means between said surfaces, and an actuating and locking member adapted to retain the linkage means in locked position when a wheel is engaged by the wheel engaging surface and adapted, when actuated, to move the linkage means partially to collapse the chock and automatically effect retraction of the wheel engaging surface from the wheel.

A still further object of the invention is the provision of improved wheel chocks of extremely sturdy, yet highly economical construction and assembly.

According to the present invention, we provide improved wheel chocks, in several embodiments, comprising, as above noted, a wheel engaging surface, a ground engaging purchase surface, linkage means between the surfaces, and a linkage actuating member, a predominant feature of the combination of these components being the utilization of the purchase surface as a pivot or fulcrum about which the components of the chock are moved when the actuating member is operated, positively and automatically to move the wheel engaging surface entirely away from the wheel blocked thereby, not only to drop the wheel engaging surface downwardly, but fully to move the wheel engaging surface horizontally away from the wheel. Thus, the present invention affords a retractable wheel chock as opposed to merely collapsible chocks as have previously been proposed in the art.

In a first embodiment of the present invention, a ground engaging member having a purchase surface and a wheel engaging member are connected together by a toggle linkage, and a cam-lock type of actuating member cooperates with the linkage normally to lock the chock in set up position and, when actuated to cam the linkage over center simultaneously to move the members of the chock about the fulcrum defined by the purchase surface, to collapse the chock and to retract the wheel engaging member from the wheel blocked thereby.

In a second embodiment of the invention, we provide an improved wheel chock comprising a plate or body member having a wheel engaging surface, a link or lever pivotally connected at one end to one end of the body member, the link presenting a ground engaging purchase surface at its other end, and a cam-lock type of actuating member pivotally connected to the body member and having portions cooperating with the link normally to lock the link in an upright position with respect to the body member and adapted, when actuated, to effect movement of the body member toward the link and pivoting of both about the fulcrum defined by the purchase surface to collapse the chock and retract the body member from a wheel engaged thereby.

A modification of the above described second embodiment of the invention incorporates a safety lock in the structure between the actuating member and the link or lever to retain the actuating member against accidental or inadvertent actuation, it being an object of the invention to provide an effective safety lock that may readily be released and, in particular, a lock that may be released automatically upon what would be the normal movement of the operator to retract the chock as constructed according to the aforesaid second embodiment.

A further embodiment of the invention is constructed substantially in accordance with the aforesaid second embodiment, with the distinction that the lever or link and actuating member are operatively associated by means of a toggle link rather than a cam arrangement.

In all embodiments, the present invention provides practical, effective and economical wheel chocks enjoying the particular advantage that the chock when actuated is positively retracted from the wheel blocked thereby.

Other objects and advantages of the present invention will become apparent in the following detailed description of preferred embodiments of the invention.

Now, in order to acquaint those skilled in the art with the manner of making the wheel chocks of our invention, we shall describe, in connection with the accompanying drawings, preferred embodiments of the invention and preferred manners of making the same.

In the drawings, wherein like reference numerals indicated like parts.

Figure 1:
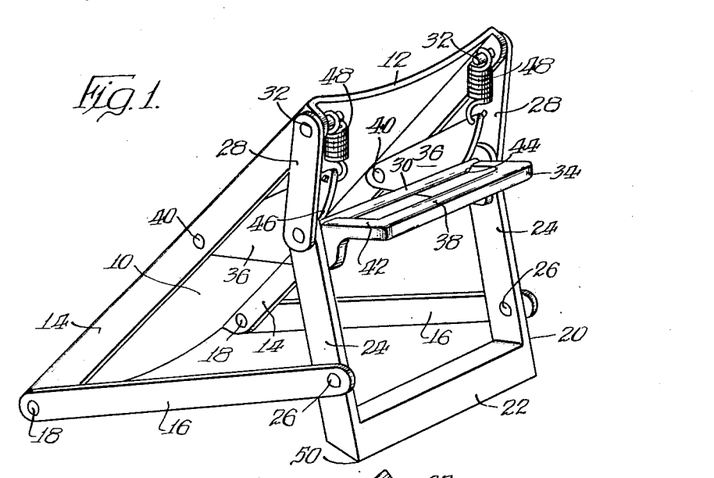
Figure 1 is a perspective view of one embodiment of the invention, the aforesaid first embodiment, the view showing the wheel chock in its locked position.
Figures 2, 3, 4:
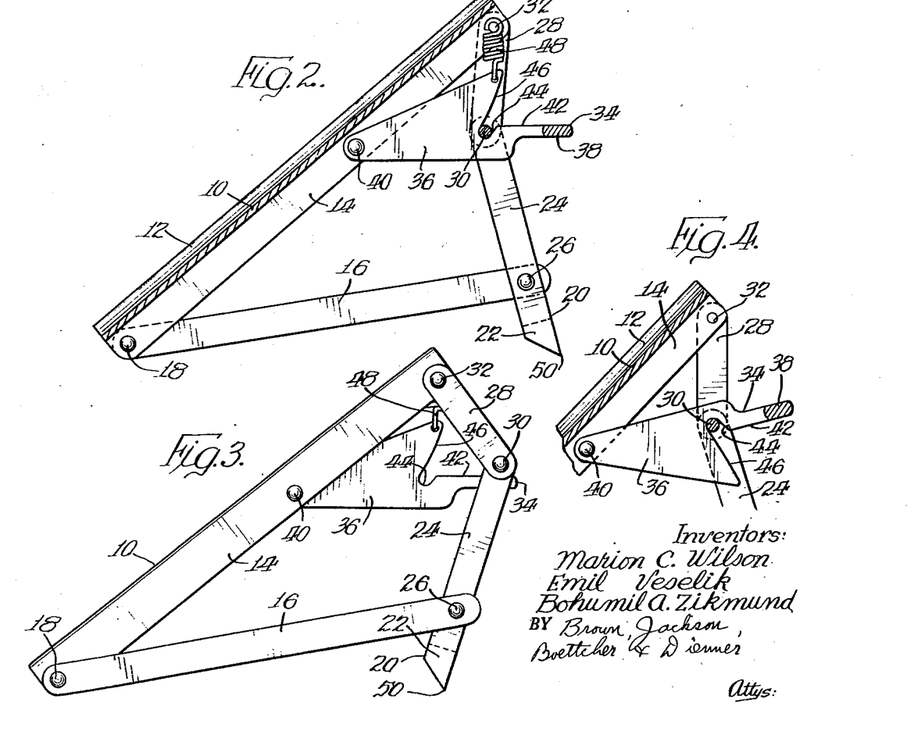
Figure 2 is a vertical longitudinal section of the embodiment of the invention shown in Figure 1, showing the chock in locked position.
Figure 3 is a side elevation of the wheel chock shown in Figures 1 and 2, showing the chock in unlocked, partially collapsed and retracted position.
Figure 4 is a partial vertical section, similar to Figure 2, showing a modification of the wheel chock of Figures 1 to 3.

Referring to the drawings, and particularly to Figures 1 to 3, one embodiment of the wheel chock of the present invention is shown as comprising a main plate or body portion 10 presenting a wheel engaging surface 12. The body 10 is generally rectangular in form and is curved transversely thereof to present a concave wheel engaging surface 12 adapted to conform to the configuration of the tire or wheel to be engaged thereby to prevent lateral disassociation of the wheel and the wheel chock. The body portion or plate 10 preferably includes a flange portion 14 at each side thereof extending generally in the same direction as the concavity of the wheel engaging surface 12 of the plate. The plate, including the wheel engaging surface 12 and the side flanges 14 thereof, preferably comprises an integral casting. However, the plate may be an integral sheet metal stamping or may be formed of a plurality of parts suitably welded together. In any case, the plate 10 is preferably formed of a sturdy, wear resistant metal, such as steel.

Adjacent the forward or lower end of the plate 10, a pair of links or straps 16 are pivotally connected at one end to the outer surface of the side flanges 14 by means of suitable pivot pins 18 extending through the links and the flanges. At their opposite ends, the links 16 are pivotally connected to a ground engaging member 20 adjacent the ground engaging surface thereof. The ground engaging member 20 is preferably an integral U-shaped casting comprising a cross bar or bight portion 22 and a pair of legs or links 24 extending therefrom. If desired, the cross bar or bight portion 22 of the ground engaging member 20 may be omitted, and the ground engaging member may simply comprise the two legs 24. It is preferred, however, that the ground engaging member 20 be of U-shape as will become apparent hereinafter. While the ground engaging member 20 is preferably cast, as stated, it will be apparent that same may be fabricated in other manners. The links 16 are preferably connected to the ground engaging member 20 adjacent the lower surface thereof by suitable pivot pins 26.

At the upper end thereof, the legs 24 are pivotally connected to one end of a pair of links 28 by means of a continuous pivot pin 30 extending between and connecting the pair of legs 24 and the pair of links 28. The links 24 and 28 comprise a toggle linkage, the central joint of which comprises the connection between the links 24 and 28, or the pivot pin 30. The central joint of the links 24 and 28, or the pin 30, is adapted for movement to either side of the central point of movement of the links, as will be pointed out hereinafter. At their opposite ends, the links 28 are pivotally secured to the upper end of the body portion or plate 10 of the wheel chock. As shown, the upper ends of the links 28 are preferably connected to the flange portions 14 of the main plate 10 by means of suitable pivot pins 32.

Pivotally connected to the plate 10, intermediate its ends, is a cam-lock member 34. The cam-lock member 34 preferably comprises an integrally formed casting of generally U-shape having two legs 36, each comprising a cam or cam plate, and a cross bar 38 forming a handle or the like between the two legs. While the cam-lock member preferably comprises an integral U-shaped casting, the same may comprise either a pair of cam plates, similar to the cam plate 36, or a single cam plate, as may be desired. Each of the cam plates or legs 36 of the cam-lock member 34 is pivoted to the inner surface of the flanges 14 of the body portion 10 at one end thereof by means of suitable pivot pins 40. Each of the cam plates comprises a generally horizontal surface 42 leading from the handle portion 38 to a locking recess or groove 44 and a cam surface 46 extending from the locking recess 44 in a direction generally normal to the surface 42. The horizontal surface 42, the locking recess 44 and the cam surface 46 are adapted to cooperate with the central joint of the toggle linkage comprising the links 24 and 28, or the pin 30, in a manner to be described. To retain the horizontal surface 42 and the locking recess 44 in engagement with the pin 30, a pair of coil springs 48 are suitably disposed between the pivot pins 32 and the cam plates 36. Preferably, the pivot pins 32 are elongate so that one end of the springs 48 may be slipped thereover, and the cam plates 36 are each provided with an aperture adjacent one edge thereof adapted for the reception of the opposite end of the springs 48.

As is clearly shown in Figures 2 and 3, the lower ends of the legs or links 24 or the lower end of the cross bar 22 of the ground engaging member 20 is provided with a biting edge or ground engaging purchase surface 50. The biting edge or ground engaging purchase surface 50 is formed on the ground engaging member 20 by providing an angle of less than 90° between the adjacent surfaces of the cross bar 22 of the member at the rearward edge thereof. Preferably, the adjacent surfaces at the rearward portion of the cross bar 22 are disposed at an angle of approximately 60° with respect to one another. The angle forming the purchase surface 50 may be varied as desired, but the angle should not be so sharp as to present a weakened section or edge portion at the bottom of the ground engaging member 20.

In use and operation of the wheel chock shown in Figures 1 to 3, the chock, disposed in either the position shown in Figure 3 or the position shown in Figure 1, is slid toward a wheel to be blocked by the chock. In sliding toward the wheel, the chock rides upon the forward surfaces of the links 16 or on the front edge of the flange portions 14 of the plate 10 and the purchase surface 50 of the ground engaging member 20. When the wheel engaging surface 12 of the plate 10 engages the wheel, the purchase surface 50 of the ground engaging member 20 effectively bites into the surface engaged by the member. If the chock is disposed in set-up or locked position as shown in Figure 1, the surface 50 bites into the ground to positively block the wheel. If the chock is partially collapsed, as shown in Figure 3, the surface 50 bites into the ground to provide a purchase or pivot point so that movement of either or both of the links 24 toward the plate 10 will effect movement of the links 16 forwardly to force the wheel engaging surface 12 of the plate 10 into firm engagement with the wheel. At the same time, the links 24 and 28 and the pivot pin 30 move to a position approaching and then overrunning the central point of movement of the links. After the links have been moved over center, the same will automatically move away from center to effect movement of the pivot pin 30 into engagement with the cam surface 46 of each cam plate 36, at which time the springs 48 will lift the cam-lock member 34 so that the pin 30 is received within the locking recesses 44 in the cam members 36. Once the pin 30 has been moved into the locking recesses 44, the toggle linkage will be locked against movement, thus locking the chock in wheel engaging or blocking position. The ground engaging purchase surface 50 of the ground engaging member 20 is relatively sharp so as to insure a biting grip in the ground to effect the movements defined and to prevent movement of the chock once the same has been disposed in locking position in engagement with a vehicle wheel. The arcuate surface 12 of the wheel engaging plate 10 is adapted to conform to the surface of the wheel engaged by the plate to prevent lateral disassociation of the wheel and the chock. Accordingly, it will be appreciated that the chock will firmly engage the wheel to prevent movement thereof. While the chock has enhanced action when associated with a resilient tire or the like, the same is equally adapted to the blocking of non-resilient wheels and the like.

When it is desired to remove the chock from the wheel, release may be readily accomplished solely by actuation of the handle 38 of the cam-lock member 34 in a downward direction. As the member 34 is moved downwardly, the pin 30 is released from the locking recesses 44 and is engaged by the cam surfaces 46 which, upon continued downward movement of the member 34, cam the pin 30 rearwardly away from the plate 10 to move the pin 30 and the links 24 and 28 back over the central point of their movement, at which time, the links and pin will continue movement in a rearward direction due to their own disposition, and also due to the force exerted thereon by the wheel blocked by the chock. Accordingly, the chock will rapidly assume the position shown in Figure 3. In reaching the position shown in Figure 3, rearward movement of the upper end of the link 24 will effect movement of the links 16 to retract the lower end of the plate 10, and rearward movement of the link 28 will retract the upper end of the plate 10 from the wheel to automatically move the chock away from the wheel and release the wheel. In other words, the wheel engaging plate 10 in its entirety will be drawn horizontally away from the wheel, in the direction rearwardly of the chock, to free the wheel and to dispose the chock in spaced relation to the wheel for convenient removal. Accordingly, it will be appreciated that downward movement of the cam-lock member 34 readily and automatically effects release and retraction of the chock.

As will be appreciated from the foregoing, a critical point or center of linkage movement exists between the wheel engaging member and the surface on which the chock and the wheel to be blocked rest. With the particular toggle linkage, this critical center is the center of movement of the toggle links. To one side of the critical center, the linkage is disposed in an extended position, as is shown in Figure 1, to hold the wheel engaging member and the chock in set-up, wheel blocking position. When the linkage is moved to the other side of the critical center, the linkage is collapsed or moved to a non-extended position so that the chock is collapsed and retracted from the wheel, as is shown in Figure 3.

The various links and the cam-lock member 34 are preferably disposed in the relative positions shown in Figures 1 to 3 so that the chock may be readily actuated by the foot of the user. For example, when moving the chock into engagement with the wheel, the user may merely set the chock on the ground in either the extended position shown in Figure 1 or the non-extended position shown in Figure 3, apply his foot to either of the links 24 or 28 or to the pivotal connection therebetween and move the chock into engagement with the wheel. When the chock is in the position shown in Figure 3, continued application of force with his foot by the user will effect movement of the links over center in the manner described to lock the chock in wheel blocking position. To release and retract the chock from the wheel, the user need only step on the handle portion 38 of the cam-lock member 34 to effect the action described hereinbefore. Accordingly, it will be appreciated that the chock of the present invention is adapted for ready and convenient actuation and operation. Since the chock is adapted to be collapsed when dissociated from the wheel, it will be appreciated that the chock will occupy little room when not in use. Since the various members of the chock are preferably formed of castings and in a minimum number of parts, it will be appreciated that the manufacture and assembly of the chock is highly economical and that the completed chock is extremely sturdy and capable of long and efficient use.

A modification of the above described embodiment of the present invention is shown in Figure 4 wherein the structure is identical to the embodiment of the invention previously described with the exception that the cam-lock member 34 is disposed in an inverted position and the springs 48 are omitted, since the cam-lock member 34 is then adapted for actuation in response to gravity. To move the chock into wheel blocking position, the actuation is the same as that described hereinbefore. To release and retract the chock from the wheel, however, the cam-lock member 34 must be actuated in an upward direction by exerting an upward pull on the handle portion 38 of the member 34.

Figure 5:
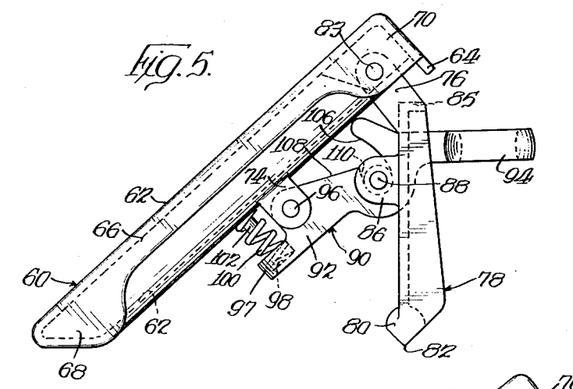
Figure 5 is a side elevation of a second embodiment of the invention showing the chock in set-up position.
Figure 6:
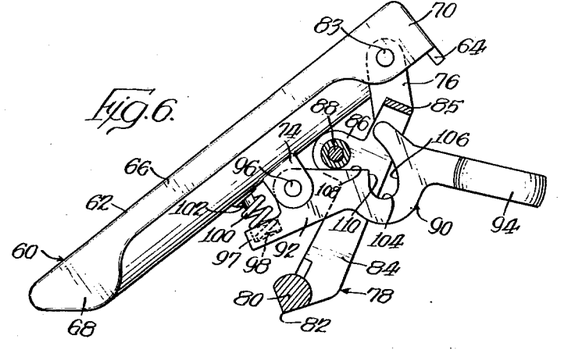
Figure 6 is a side view, partly in section and partly in elevation, of the chock of Figure 5, the view showing the chock in retracted position.
Figure 7:
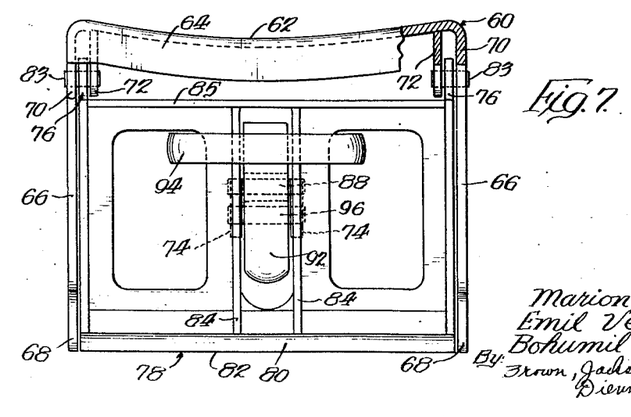
Figure 7 is a rear elevation of the second embodiment of the invention.

Referring now to Figures 5 to 7, a second embodiment of the present invention is shown as including a generally rectangular plate or body member 60 having an arcuate wheel engaging surface 62. At the rearward edge thereof, the body member or plate 60 is provided with a transverse reinforcing web 64. At the opposite sides thereof, the plate 60 is provided with depending flange portions 66 which cooperate with the web 64 to fully reinforce the wheel engaging member to prevent distortion and flexing of the member. The side flanges 66 are provided at the forward edge thereof with relatively enlarged portions 68 comprising toes or the like upon which the wheel engaging member is adapted to be slid. At the rearward edge thereof, the flanges 66 are provided with an enlarged portion 70. At each side of the body member adjacent the rearward edge thereof, a flange 72 is provided in spaced parallel relation to the enlarged flange portion 70 for a purpose to be described hereinafter. At the midportion thereof, the body member 60 is provided with a pair of spaced bosses or flange portions 74, the purpose of which will also be described hereinafter. If desired, the body member 60 may have a corrugated surface, or have a plurality of apertures therein, to provide a wheel engaging surface that will impress itself to some degree into a rubber tire. The apertures also serve to reduce the weight of the wheel chock and the amount of material required in the formation thereof. Preferably, the body member comprises an integral casting consisting of the plate 60, the reinforcing web 64, the side flanges 66, the flange portions 72 and the spaced bosses 74. It will be appreciated, however, as was pointed out hereinbefore with respect to the wheel engaging member of the embodiments of the invention previously described, that the body member may be formed in any one of many suitable manners.

The flange portions 70 and 72 on the body member 60 are each adapted for the reception therebetween of the upper end of a leg portion 76 of a generally U-shaped link or lever 78. The link 78 includes a bight portion 80 which is generally cylindrical in cross section and is provided at its lower surface with a pointed edge 82 comprising a purchase or ground engaging surface for the wheel chock. The surface 82 may comprise a straight cutting edge or may be serrated or fluted to present a plurality of points. The legs 76 of the U-shaped link or lever 78 may be suitably pivotally connected to the body member 60 by means of suitable pins 83 passing through aligned apertures provided in the flange portions 70 and 72 and the leg portions 76 of the link 78. The link 78 is preferably reinforced by a pair of spaced parallel vertical bracket means or reinforcing webs 84 and a horizontal web 85 extending between the leg portions 76 and bridging the webs 84 adjacent the upper end of the link 78, immediately below the flange portions 70 and 72 of the body member 60. Each of the vertical webs 84 is provided with a forwardly extending projection 86. The link 78 preferably comprises an integral casting including the legs 76, the bight portion 80, the spaced webs 84, the web 85 and the spaced projections 86. It will be appreciated, however, that the U-shaped link 78 may be formed in any desired manner. The forwardly extending projections 86 of the reinforcing webs 84 are adapted for the reception therebetween of a pin and roller assembly 88.

The spaced bosses 74 provided on the body member 60 are adapted for the reception and pivotal support of a cam-lock type actuating member 90. The cam-lock member 90 includes a generally bar-like body portion 92 and an elliptical handle portion 94. The cam-lock member 90 is pivoted intermediate its ends between the spaced bosses 74 by means of a suitable pivot pin 96 passing through aligned apertures provided in the bosses 74 and the member 90. The bar-like body portion 92 of the cam-lock member 90 is freely received between the spaced parallel reinforcing webs 84 and projections 86 of the link 78, below the web 85, and the handle portion 94 of the cam-lock member is disposed to the rearward side of the link 78, as is clearly shown in Figures 5 and 6. The cam-lock member 90 is provided with an overhanging forward portion 97 having a recess or bore 98 therein adapted for the reception of a coil compression spring 100. The spring 100 is suitably confined between the cam-lock member 90 and the wheel engaging member 60. The member 60 is preferably provided with an integral projection 102 over which the spring 100 fits so as to prevent disassociation of the spring with respect to the body member and the cam-lock member.

The bar-like portion 92 of the cam-lock member 90 is provided with a locking recess 104, Figure 6, a curved cam surface 106 leading to the recess 104, a generally flat surface 108 also leading to the recess 104, and a lip portion 110 between the recess 104 and the surface 108. The locking recess 104 of the cam-lock member is adapted for the reception of the roller 88 provided on the link 78. The cam surface 106 of the cam-lock member is preferably such as to confine the roller 88 within the space defined between the wheel engaging member 60 and the cam-lock member 90. As will be appreciated from a consideration of Figure 5, the spring 100 normally retains the roller 108 in the locking recess 104 so as to lock the link in the relative position with respect to the wheel engaging member as is shown in Figure 5.

As is shown in the drawings, the wheel engaging member 60 is adapted to be normally disposed at an angle with respect to the surface on which the wheel to be blocked by the chock rests. Accordingly, the link 78 must be moved to an extended position so as to support the wheel engaging member 60 in a set-up position as is shown in Figure 5. As will be appreciated from a consideration of the figure, the link 78 must be moved to such extent with respect to the wheel engaging member as to support the member in the relationship defined so that upon exertion of pressure on the wheel engaging surface 62 by a wheel engaged thereby, the link 78 will cooperate with the body member 60 to prevent movement of the wheel. It will be appreciated, therefore, that the link 78 must be moved to one side of the critical center of movement of the link. Considering Figure 5, it will be appreciated that the critical center of the linkage of the wheel chock shown in the figure lies approximately on a vertical line intersecting the pivotal mounting of the link 78. Accordingly, to support the wheel engaging member 60 in its set-up position, the link 78 should be disposed in an extended position to the rear of the vertical or critical center so as to properly support the load imposed upon the wheel engaging member 60. It will be appreciated that when the link 78 is disposed to the front side of the critical center of its movement, the link will be disposed in a non-extended or collapsed position and will tend to move toward the body member 60 so as to collapse the chock, as is shown in Figure 6. Therefore, the relationship of the cam-lock member and the link is such that the roller 88 is received within the locking recess 104 when the link 78 has been moved to the rearward side of its critical center. It will also be appreciated that the cam surface 106 is adapted to move the roller 88 and the link 78 to the other side of the critical center so as to collapse the chock.

In use, the chock is disposed in set-up position as is shown in Figure 5 and is then slid toward the wheel to be blocked. When the wheel engaging surface 62 of the body member 60 engages the wheel, the purchase surface 82 of the link 78 will bite into the surface engaged thereby to positively lock the chock in wheel engaging position. The arcuate surface of the wheel engaging member 60 will prevent lateral disassociation of the chock and the wheel, as has been pointed out hereinbefore. To retract the chock from the wheel engaged thereby, the operator need merely step on the handle portion 94 of the cam-lock member 90 to effect automatic retraction and collapsing of the wheel chock. As a downward force is exerted on the handle 94, the lip portion 110 on the cam-lock member 90 will clear the roller 88 to accommodate relative movement of the wheel engaging member 60 and the link 78. Upon continued movement of the handle 94, the cam surface 106 engages the roller 88 and effects such camming action as would move the link 78 toward the wheel engaging member 60. The purchase surface 82 of the link 78 being embedded in the ground, however, necessitates resolution of the action between the cam surface 106 and the roller 88 into movement of the wheel engaging member 60 rearwardly and away from the wheel engaged thereby, as is accomplished by moving the pivot pin 96 of the cam-lock member 90 toward the roller 88. Continued downward exertion of force on the handle 94 results in pivoting the chock about the fulcrum defined by the purchase surface 82 during continued retraction and collapsing of the chock until the chock is fully collapsed as shown in Figure 6. In Figures 5 and 6, the fulcrum points 82 as shown therein are vertically aligned so that a comparison of the two figures will clearly reveal the manner in which and the degree to which the chock is retracted at this stage of operation. At this point, retraction is substantially complete, but the user will necessarily continue to move his foot in its downward path to force the handle 94 to the ground. During the latter portion of this movement, the chock is swung bodily in an arcuate path about the fulcrum 82 to move the chock free and clear of the wheel, and the spring 100 will bias the body member 60 upwardly with respect of the cam-lock actuating member 90 to relieve the same and dispose the chock in its collapsed position, whereupon the chock may be picked up and carried away, conveniently by the handle 94.

From the foregoing, it will be appreciated that the link 78 is adapted to be moved to an extended position wherein the same is locked by means of the member 90 to retain the chock in a set-up, wheel-blocking position. Upon actuation of the cam-lock member 90, automatic retraction of the chock from the wheel is accomplished and the chock is collapsed so that the link 78 is moved to a non-extended collapsed position adjacent the lower surface of the body member 60. To recondition the wheel chock for use, the same may be set up merely by manually moving the wheel engaging member 60 and the ground engaging link 78 away from each other. During this movement, the roller 88 engages the flat surface 108 of the cam-lock member 90 to effect compression of the spring 100 so that as the roller 88 approaches the locking recess 104, the same snaps into the locking recess to lock the chock in set-up position.

If desired, the cam-lock member of the embodiments of the invention may be provided with an elongate handle or the like to facilitate actuation of the chock from a remote point.

Figures 8, 9, 10:
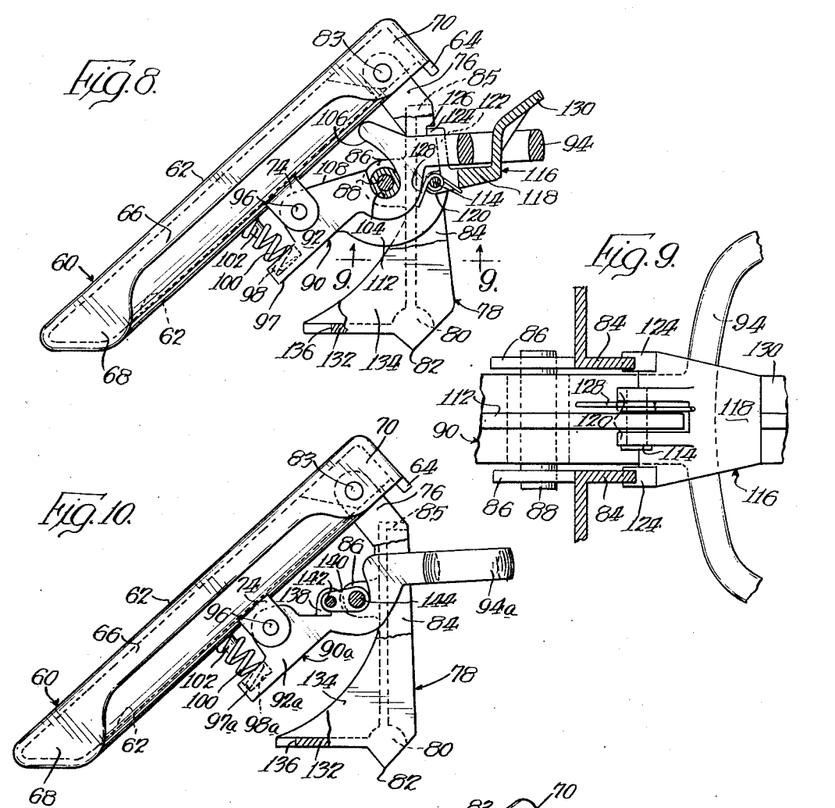
Figure 8 is a side view, partly in section and partly in elevation, of a modification of the chock shown in Figures 5 to 7 disclosing a safety lock therefor.
Figure 9 is a fragmentary horizontal section taken substantially on line 9—9 of Figure 8.
Figure 10 is a side view, partly in section and partly in elevation, of a further embodiment of the invention showing the chock in set-up position.

A modification of the Figure 5 embodiment of the present invention is shown in Figures 8 and 9. The structure of the modified chock as a whole is identical to that previously described, with the addition thereto of a safety lock for the actuating or cam-lock member, and for this reason the same reference numerals are employed in Figures 8 and 9 for parts similar or identical to parts previously described. In practice, it has been found desirable to include a safety lock in the structure previously described to provide positive insurance against inadvertent actuation of the cam-lock member, not because of an inability of the member 90 to lock the chock in wheel-blocking position, but because of the disastrous consequences that could result from accidental retraction of the chock. To afford a practical safety lock, it is highly desirable to provide a lock that is adapted to be freed automatically upon such manipulation by the user as would be normal in effecting retraction of the previously described embodiment of the invention. To accommodate the incorporation of such a safety lock, the cam-lock member 90 is provided with a depending reinforcing rib 112 extending about the locking recess 104 in the member. Adjacent the handle 94, the ribs 112 is apertured for the passage of a pivot pin 114 accommodating the pivotal mounting to the rib of a safety lock, indicated generally at 116. The lock 116 preferably comprises a unitary casting including a body portion 118 formed at the inner end thereof to define a lower inwardly disposed bifurcation 120 within which the rib 112 is received and by means of which the body is pivotally mounted on the rib. Laterally outwardly of the bifurcation 120, the lock is further bifurcated to define a pair of upwardly extending legs 122 which are disposed to opposite sides of the cam-lock member 90 between the handle 94 and the link 78. At the upper end thereof, the legs 122 include forwardly extending locking fingers 124 which are disposed in alignment with the reinforcing webs 84 and are adapted to be received in recesses 126 in the webs 84 in the extended position of the link 78 with respect to the wheel engaging member 60. To normally bias the lock in such direction as to dispose the fingers 124 in the recesses 126, a torsion spring 128 is disposed about the pin 114 to engage the cam-lock member 90 and the lock 116 at its opposite ends. The body 118 of the lock extends rearwardly beneath the handle 94 to the hand grip opening therein, at which point the same extends generally vertically upward through the hand grip opening and terminates in an inclined actuating tab 130 overlying the handle 94.

In use, the fingers 124 of the safety lock 116, due to the spring 128, are automatically engaged in the recesses 126 in the webs 84 when the link 78 is moved to extended position with respect to the wheel engaging member 60. In such position, the lock provides positive insurance against inadvertent actuation of the chock and assists in retaining the chock in its set-up position, as is shown in Figure 8. In normally retracting the chock, as described in conjunction with Figures 5 and 7, the operator would put his foot on the handle 94 and step down. As will be appreciated, this same manual movement with the Figure 8 embodiment of the invention will automatically result, first, in depression of the tab 130 of the lock to swing the lock about the pivot 114 to release the fingers 124 from the recesses 126, and, second, in the previously described operation of the parts to effect retraction of the wheel engaging member. Thus, the safety lock 116 according to the present invention affords positive insurance against inadvertent or accidental actuation of the chock without in any way impairing the operational characteristics of the chock.

In addition to the foregoing, it has been found desirable to provide a ground engaging surface of substantial area to accommodate use of the chock on muddy, sandy and other relatively unfirm surfaces. As will be appreciated, the line contact purchase surface defined by the lower edge 82 of the link 78 is normally desired to be the only contact of the link with the supporting surface. However, in muddy and sandy soils, this edge would normally sink into the soil and render the chock less efficient and practical. To overcome this possible disadvantage and insure optimum performance of the chock under all conditions, we equip the link 78, at the lower portion thereof, with a forwardly extending plate 132 of substantial area. This plate is preferably formed integrally with the link 78 and is reinforced by means of integral side flanges 134. The plate 132 is spaced vertically above the purchase edge 82 of the link and will not normally engage the surface on which the chock is rested, thus to insure the normal desirable action of the chock on relatively hard surfaces, as previously described. On soft surfaces, however, such as the shoulders of roads, on which the edge 82 would not bite into the surface a limited amount but would tend to sink deeply into the surface, the plate 132 engages the surface and due to its substantial area prevents further sinking of the chock and retains the same in position effectively to block a wheel. Even in such cases, wherein the plate 132 engages the surface on which the chock is placed and supports the chock on such surface, actuation of the chock will still occur substantially about the fulcrum defined by the purchase edge 82, as will be apparent. Thus, the addition of the plate 132 does not detract from the advantageous operation of the chock, but does enhance the field of applicability of the chock. The forward edge of the plate 132 is preferably arcuate, as indicated at 136, to conform somewhat to the configuration of the wheel engaging member 60 to accomodate maximum collapsing of the chock.

Figure 11:
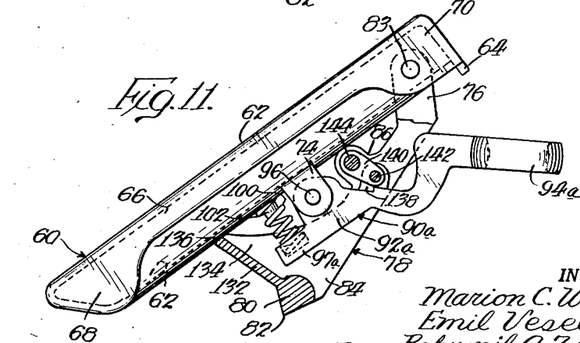
Figure 11 is a side view, partly in section and partly in elevation, of the chock of Figure 10 showing the same in retracted position.

Referring now to Figures 10 and 11, a further embodiment of the invention is disclosed wherein the construction is very similar to that employed in the embodiments of Figures 5 to 9 with the exception that the link or lever and actuating member are operatively associated by means of a toggle link instead of a cam-lock arrangement. Specifically, the wheel engaging member and link or lever are the same as those described and thus are indicated by the same reference numerals as previously employed, and the actuating member is very similar to that previously described so that the various portions thereof corresponding to portions of the cam-lock member 90 are indicated by the same reference numerals with the suffix "a." As shown, the actuating member 90a is generally similar to the cam-lock member 90 described hereinbefore, with the exception that the cam and recess portions 104, 106, 108 and 110 are eliminated. The member 90a is pivotally mounted intermediate its ends on the wheel engaging member 60 by the pivot pin 96 passing through the lock 74 on the plate 60 and through the body 92a of the member 90a. At its forward end, 97a, the member 90a is biased in a predetermined direction by the spring 100 fitting in a recess 98a in the actuating member, and at its other end, the member 90a terminates in a handle 94a. Intermediate its ends, the actuating member 90a is provided with a pair of spaced parallel upstanding tabs 138 formed integrally therewith, the same projecting substantially vertically from the handle to be received between the projection 86 on the link or lever 78 to accommodate movement of the link 78 with respect of the actuating member 90a. The tabs 138 and the projections 86 are adapted for the reception therebetween of the opposite ends of a toggle link 140 by means of which the link 78 and member 90a are connected, the toggle link being pivotally connected to the actuating member 90a by pivot pin 142 extending through the tabs 138 and the link 140, and to the link 78 by a pivot pin 144 extending through the projections 86 and the toggle link 140.

In use, the actuating member 90a is movable against the bias of the spring 100 to accommodate movement of the toggle link 140 to opposite sides of its center of movement, the spring 100 being effective upon disposition of the toggle link to either side of its center of movement to maintain said link to that side of its center and to bias the link to the furthest point from said center accommodated by the assembly. Considering retraction of the chock, downward exertion of force on the handle 94a, in the position shown in Figure 10, results in moving the pin 142 in an arc, as defined by the toggle link 140, about the pin 144, the pin 144 being retained relatively stationary due to the biting engagement of the edge 82 of the link 78 in the surface on which the chock is rested. Arcuate movement of the pin 142 in the manner described results in movement of the wheel engaging member 60 along the supporting surface toward the link 78 to effect automatic retraction of the chock from the wheel. In sequence, the spring 100 is first compressed during which the pin 142 is moved through part of its arc, then the continued downward application of force on the handle 94a results in drawing the plate 60 toward the link 78 and simultaneously the link 78 starts to pivot rearwardly about the fulcrum defined by the line contact or edge 82 until the link is brought to its dead center position, which is approximately vertical in the embodiment disclosed. Upon continued movement to move the link slightly over center, to the side opposite that shown in Figure 10, the spring 100 snaps the toggle linkage to the position shown in Figure 11 by simultaneous movement of the plate 60 toward the link 78 and pivoting of the link 78 about the fulcrum 82. In Figures 10 and 11, the fulcrum points 82 are vertically aligned so that a comparison of the two figures clearly shows the retraction of the wheel engaging member 60 that takes place upon actuation of the member 90a as thus far described. After this retraction of the chock, the user necessarily will continue application of downward force on the handle 94a to move the handle to the ground and will thus swing the chock about the fulcrum 82 to move the chock free and clear of the wheel, whereupon the chock may be picked up and carried away, conveniently by the handle 94a.

The chock, as will be apparent, will be held in its retracted position, due to the toggle linkage arrangement, by the spring 100. To set the chock up for use, it is merely necessary to separate the link 78 and plate 60 until the toggle linkage again snaps over center, whereupon the chock is maintained in its wheel-blocking position by the spring 100.

In describing the retraction of the various embodiments of the wheel chock hereinbefore, it is to be appreciated that the chock has been considered as being engaged by and blocking a wheel.

From the foregoing, it will be apparent that the present invention provides improved wheel chocks having improved and positive actuation for efficiently blocking the wheel of vehicles, airplanes and the like. It will also be appreciated that the formation and assembly of the chock is accomplished in an extremely economical manner and that the completed chocks are of sturdy construction and adapted to stand up under severe service over substantial periods of time. The chocks of the present invention afford highly practical wheel-blocking means of a particularly economical formation, the chocks have their principal advantage in that the same are positively retracted from and moved free and clear of the wheel blocked thereby upon very convenient actuation by the user. In other words, simple actuation of the chock by one foot of the user automatically results in moving the chock away from the wheel so that the wheel is completely freed and so that the chock may be readily picked up and carried away without any necessity for manually pulling the same out from under a wheel, or driving the vehicle over the chock before the same can be removed, as has been customary heretofore with conventional wheel chocks that merely collapse, as opposed to being positively retracted from the wheel blocked thereby.

While we have described what we regard to be preferred embodiments of our invention, it will be apparent that various changes, rearrangements and modifications may be made therein without departing from the scope of the invention, as defined by the appended claims.

We claim:

1. A wheel chock comprising a wheel engaging member normally disposed at an inclination to the surface on which the wheel is resting and slidably engaging said surface at its lower end, linkage means pivotally connected to said wheel engaging member and including a link movable relative to said wheel engaging member and normally extending upward from said surface toward the upper end of said wheel engaging member, said link having a lower edge portion normally biting into said surface and defining a fulcrum, and an actuator operatively associated with and movable relative to said wheel engaging member and said link, said actuator including means normally locking said link and said wheel engaging member in predetermined relation to one another to define a rigid triangle whereby said wheel engaging member is normally retained in inclined wheel blocking position, said actuator also including means operable upon movement of said actuator for releasing said locking means and substantially simultaneously pivoting said linkage means about said fulcrum and moving said wheel engaging member along said surface toward said link positively to retract said wheel engaging member from the wheel and initiate collapsing of the chock.

2. A wheel chock as set forth in claim 1, including a toggle link operatively connecting said actuator and said link, said toggle link being disposed to opposite sides of its center of movement in the normal and collapsed positions of the chock to retain the chock in the respective positions.

3. A wheel chock as set forth in claim 1, said linkage means including a second normally upright link pivotally connected at its upper end to the upper end of said wheel engaging member, and a pin pivotally connecting the lower end of said second link to the upper end of the first link, said links thereby defining a toggle, said actuator including a blocking surface to the side of the center of movement of said toggle adjacent said wheel engaging member, said pin normally engaging said blocking surface to retain said links in their normal upright positions, said means for pivoting said linkage means upon movement of said actuator moving said pin rearwardly to the opposite side of the center of movement of said toggle to initiate collapsing of the chock.

4. A wheel chock comprising a wheel engaging member normally disposed at an inclination to the surface on which the wheel is resting and slidably engaging said surface at its lower end, linkage means pivotally connected to said wheel engaging member and including a link movable relative to said wheel engaging member and normally extending upward from said surface toward the upper end of said wheel engaging member, said link having a lower edge portion normally biting into said surface and defining a fulcrum, and an actuator movably mounted on said wheel engaging member and including means operatively associated with and movable relative to said link, said means including a locking means normally retaining said link in said normal position relative to said wheel engaging member to define a rigid triangle whereby said wheel engaging member is normally retained in inclined wheel blocking position, said actuator being movable to release said locking means, said means also including a motion transmitting means operable upon movement of said actuator and substantially simultaneously with release of said locking means for pivoting said link about said fulcrum and moving said wheel engaging member along said surface toward said link positively to retract said wheel engaging member from the wheel and initiate collapsing of the chock in a generally horizontal direction away from the wheel.

5. A wheel chock comprising an inclined wheel engaging member, linkage means pivotally connected at its one end to the upper end of said wheel engaging member and normally extending generally vertically downward therefrom, said linkage means having its lower end formed with a ground engaging edge defining a fulcrum, and actuating means operatively associated with and movable relative to said wheel engaging member and said linkage means, said actuating means including a locking means normally locking said linkage means to said wheel engaging member in said generally vertical position whereby said wheel engaging member is normally retained in inclined wheel blocking position, said actuating means being movable to release said locking means and including a motion transmitting means operable substantially simultaneously with release of said locking means for pivoting said linkage means about said ground engaging edge thereof and moving said wheel engaging member in a generally horizontal direction toward said linkage means positively to retract said wheel engaging member from a wheel engaged thereby and to initiate collapsing of the chock in a generally horizontal direction away from the wheel.

6. A wheel chock comprising an inclined wheel engaging member, linkage means pivotally connected at its one end to the upper end of said wheel engaging member and normally extending generally vertically downward therefrom, said linkage means having its lower end formed with a ground engaging edge defining a fulcrum, locking means operatively associated with and movable relative to said wheel engaging member and said linkage means for normally locking said linkage means to said wheel engaging member in said generally vertical position whereby said wheel engaging member is normally retained in inclined wheel blocking position, and camming means operatively associated with said linkage means and said locking means operable upon unlocking movement of said locking means for pivoting said linkage means around the ground engaging edge thereof and moving said wheel engaging member in a generally horizontal direction toward said linkage means positively to retract said wheel engaging member from a wheel engaged thereby and initiate collapsing of the chock.

7. A wheel chock comprising an inclined wheel engaging member, linkage means pivotally connected at its one end to the upper end of said wheel engaging member and normally extending generally vertically downward therefrom, said linkage means having its lower end formed with a grounded engaging edge defining a fulcrum, a pin carried by said linkage means, and a unitary cam-lock member pivotally connected to said wheel engaging member and operatively associated with and movable relative to said pin, said cam-lock member having a locking recess therein normally receiving said pin and positively locking said linkage means to said wheel engaging member in said generally vertical position whereby said wheel engaging member is normally retained in inclined wheel blocking position, said cam-lock member including a cam surface leading from said recess engageable with said pin upon actuation of said cam-lock member for moving said cam-lock member and said wheel engaging member in a generally horizontal direction toward said linkage means and pivoting said linkage means about said ground engaging edge thereof positively to retract said wheel engaging member from a wheel engaged thereby.

8. A wheel chock comprising a wheel engaging member normally disposed at an inclination to the surface on which the wheel is resting and slidably engaging said surface at its lower end, linkage means pivotally connected to said wheel engaging member and including a link movable relative to said wheel engaging member and normally extending upward from said surface toward the upper end of said wheel engaging member, said link having a lower edge portion normally biting into said surface and defining a fulcrum, a pin operatively associated with said link, and a unitary cam-lock member movably connected to said wheel engaging member and operatively associated with and movable relative to said pin, said cam-lock member having a locking recess therein normally receiving said pin and locking said link to said wheel engaging member in said normal position thereof to define a rigid triangle whereby said wheel engaging member is normally retained in inclined wheel blocking position, said cam-lock member including a cam surface leading from said recess engageable with said pin upon actuation of said cam-lock member for camming said cam-lock member and said wheel engaging member in a generally horizontal direction toward said link and for pivoting said link about said fulcrum positively to retract said wheel engaging member from the wheel and initiate collapsing of the chock in a generally horizontal direction away from the wheel.

9. A wheel chock comprising a normally inclined wheel engaging member, a single normally upright link pivotally connected at the upper end thereof adjacent the upper end of said member, said link at its lower end having a ground engaging portion defining a fulcrum, said link at its lower end being movable with respect to said wheel engaging member to opposite sides of a vertical center line projected downwardly from the pivotal connection of said link to said member, and a lock member operatively associated with and movable relative to said wheel engaging member and said link, said lock member including means normally blocking said link to one side of but adjacent said center line to retain said link in said upright position and define a rigid triangle whereby said wheel engaging member is normally retained in inclined wheel blocking position, said lock member being movable to release said link for movement relative to said wheel engaging member, said lock member including means operable upon movement of said lock member and substantially simultaneously with release of said link for moving said wheel engaging member toward said link and for pivoting said link about its lower end to retract said wheel engaging member from a wheel engaged thereby and to move the lower end of said link relative to said wheel engaging member to the opposite side of said center line thereby to initiate collapsing of the chock in a generally horizontal direction away from the wheel.

10. A wheel chock comprising a wheel engaging member normally disposed at an inclination to the surface on which a wheel is resting and slidably engaging said surface at its lower end, a normally upright rigid link pivotally connected at the upper end thereof adjacent the upper rearward end of said wheel engaging member, said link at the lower edge thereof terminating substantially in a horizontal line and normally biting into the surface on which the wheel is resting to define a fulcrum, said link at its lower end being movable with respect to said wheel engaging member to opposite sides of a vertical center line projected downwardly from the pivotal connection of said link to said member, and an actuating member pivotally mounted on said wheel engaging member intermediate the ends thereof and operatively associated with said link, said actuating member normally blocking said link adjacent but to one side of said center line to define a rigid triangle whereby said link is retained in its upright position and said wheel engaging member is retained in inclined wheel blocking position, said actuating member including means operable upon actuation of said member for moving said wheel engaging member in a generally horizontal direction toward said link and for pivoting said link about said fulcrum in a rearward direction to retract said wheel engaging member from the wheel and to move the lower end of said link relative to said wheel engaging member to the opposite side of said center line, said link to said opposite side of said center line having relatively unrestricted freedom of movement to accommodate collapsing of the chock.

11. A wheel chock comprising a normally inclined wheel engaging member, a normally upright link pivotally connected at its upper end to the upper end of said wheel engaging member, said link having a ground engaging portion at its lower end, a pin fixed to said link, and a cam-lock member pivotally connected to said wheel engaging member intermediate the ends thereof, said cam-lock member having a locking recess therein normally receiving said pin and locking said link in its upright position to said wheel engaging member, said cam-lock member including a cam surface leading from said recess engageable with said pin upon actuation of said cam-lock member for camming said wheel engaging member in a generally horizontal direction toward said link and for pivoting said link about its lower end positively to retract said wheel engaging member from a wheel engaged thereby.

12. A wheel chock comprising an inclined wheel engaging member, linkage means pivotally connected at its one end to the upper end of said wheel engaging member and normally extending generally vertically downward therefrom, said linkage means having its lower end formed with a ground engaging edge defining a fulcrum, actuating means operatively associated with and movable relative to said wheel engaging member and said linkage means, said actuating means including means normally locking said linkage means in said generally vertical position thereof to said wheel engaging member whereby said wheel engaging member is normally retained in inclined wheel blocking position, said actuating means being movable to release said locking means and including means operable substantially simultaneously with release of said locking means for pivoting said linkage means about said ground engaging edge thereof and moving said wheel engaging means in a generally horizontal direction toward said linkage means positively to retract said wheel engaging member from a wheel engaged thereby, and a safety lock mounted on one of said means and normally engaged with the other of said means for locking said actuating means against inadvertent operation.

13. A wheel chock comprising a wheel engaging member normally disposed at an inclination to the surface on which the wheel is resting and slidably engaging said surface at its lower end, a normally upright rigid link member pivotally connected at its upper end to the upper rearward end of said wheel engaging member, said link member at its lower end having a ground engaging edge biting into the surface on which the wheel is resting and defining a fulcrum, an actuator pivotally mounted on said wheel engaging member intermediate the ends thereof and operatively associated with said link member, said actuator normally locking said members in said normal positions whereby said wheel engaging member is normally retained in inclined wheel blocking position, said actuator including a handle and being manually movable with respect to said members, said actuator including means operable upon movement of said actuator for moving said wheel engaging member towards said link member and for pivoting said link member about said fulcrum in a rearward direction positively to retract said wheel engaging member from the wheel, and a spring-pressed safety lock pivotally mounted on said actuator and including locking fingers, said link member having recesses therein normally receiving said fingers, said safety lock including an operating handle disposed adjacent said actuator handle to be actuated to release the lock upon initial actuation of said actuator.

14. A wheel chock comprising a wheel engaging member to be disposed at an inclination to the surface on which the wheel is resting to block the wheel, a rigid link pivotally connected at one end thereof adjacent the upper rearward end of said wheel engaging member, said rigid link at the lower edge thereof defining substantially a line contact to engage and bite into the surface on which the wheel is resting, an actuating member pivotally mounted on said wheel engaging member intermediate the ends thereof, and a toggle link pivotally connected at its opposite ends to said actuating member and said rigid link, said wheel engaging member and said rigid link being relatively movable to an extended position wherein said wheel engaging member is disposed to block a wheel, said toggle link being disposed to one side of the center of movement thereof in the extended position of said wheel engaging member and said rigid link to lock the same in said extended position, said actuating member being movable with respect to said wheel engaging member and said rigid link to move said toggle link to the other side of the center of movement thereof to move said wheel engaging member and said rigid link toward one another to a collapsed position, the said line contact engagement provided by said lower edge of said rigid link defining a fulcrum about which the latter movement takes place, said actuating member upon actuation moving said toggle link from said one side of the center of movement thereof to said other side to unlock said wheel engaging member and said link, to draw said wheel engaging member toward said link and to pivot said rigid link about said fulcrum in a rearward direction to retract said wheel engaging member from the wheel.

15. A wheel chock comprising a wheel engaging member normally disposed at an inclination to the surface on which the wheel is resting, a first link pivoted adjacent the upper end of said wheel engaging member, a second link pivoted at one end to said first link and having a ground engaging portion at its opposite end, a third link pivoted adjacent the lower end of said wheel engaging member and to said second link adjacent the ground engaging portion thereof, and a unitary cam-lock member pivoted to said wheel engaging member intermediate said first and third links and including a locking recess disposed to that side of the center of movement of said first and second links adjacent said wheel engaging member, said locking recess being disposed for reception of the central joint between said first and second links to lock said links to that side of the center of movement thereof, said cam-lock member including a cam portion leading from said recess and disposed to engage the central joint between said first and second links upon actuation of said cam-lock member to move said links to and beyond the center of movement thereof.

16. A wheel chock as set forth in claim 15, wherein said cam-lock member is disposed with the locking recess thereof opening upwardly, and means for biasing said cam-lock member in an upward direction.

17. A wheel chock as set forth in claim 15, wherein said cam-lock member is disposed with the locking recess thereof opening downwardly, said cam-lock member being normally biased by gravity into engagement with the central joint between said first and second links.

References Cited in the file of this patent

UNITED STATES PATENTS

| | | |
|---|---|---|
| 1,480,725 | Israel | Jan. 15, 1924 |
| 2,184,487 | Clark | Dec. 26, 1939 |
| 2,240,512 | Morgensen | May 6, 1941 |
| 2,496,499 | Slavico | Feb. 7, 1950 |

FOREIGN PATENTS

| | | |
|---|---|---|
| 210,193 | Germany | May 25, 1909 |
| 264,728 | Italy | May 8, 1929 |